3,410,844
**2,3,4,5 - TETRAHYDRO - 2 - OXO - 1H - 1,4 - BENZO-
DIAZEPINE - 3 - CARBOXYLIC ACID, ESTERS
AND RELATED COMPOUNDS**
Ronald J. McCaully, Chester, Pa., assignor to American
Home Products Corporation, New York, N.Y., a corporation of Delaware
No Drawing. Filed Mar. 14, 1966, Ser. No. 533,812
10 Claims. (Cl. 260—239.3)

---

ABSTRACT OF THE DISCLOSURE

This invention is directed to new and useful 2,3,4,5-tetrahydro - 2 - oxo - 1H-1,4-benzodiazepine-3-carboxylic acids, their esters and alkali metal salts having therapeutic activity, particularly as central nervous system depressants.

---

This invention relates to new and useful 2,3,4,5-tetrahydro-2-oxo-1H-1,4-benzodiazepine - 3 - carboxylic acids, their esters and alkali metal salts having therapeuti/ activity.

The novel compounds which are included within the scope of this invention are represented by the following formula:

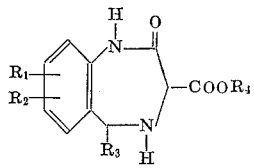

wherein $R_1$ and $R_2$ are each selected from the group consisting of hydrogen, halogen, amino and trifluoromethyl; $R_3$ is selected from the group consisting of thienyl, phenyl, halophenyl, lower alkylphenyl, and lower alkoxyphenyl; and $R_4$ is hydrogen, sodium, potassium and lower alkyl. Specific examples of such compounds include: 7-chloro - 2,3,4,5-tetrahydro-2-oxo-5-phenyl-1H-1,4-benzodiazepine-3-carboxylic acid, ethyl ester; 2,3,4,5-tetrahydro-2-oxo-5-phenyl-1H-1,4 - benzodiazepine-3-carboxylic acid, methyl ester; 7-amino-2,3,4,5-tetrahydro-2-oxo-5-phenyl-1H-1,4-benzodiazepine-3-carboxylic acid, ethyl ester; 7 - chloro-2,3,4,5-tetrahydro-2-oxo-5-phenyl - 1H-1,4-benzodiazepine-3-carboxylic acid, hydrochloride or its sodium salt.

The 2,3,4,5-tetrahydro-2-oxo-1H-1,4-benzodiazepine-3-carboxylic acid, esters of the present invention are prepared by reduction of the corresponding 2,3-dihydro-2-oxo-1H-1,4-benzodiazepine-3-carboxylic acid, esters. Although various reduction procedures may be employed, a preferred method to effect this conversion is the utilization of a proton donor with aluminum amalgam. Utilizing this preferred method, a solution of 2,3-dihydro-2-oxo-1H-1,4-benzodiazepine-3-carboxylic acid, ester in a reaction-inert solvent is admixed with aluminum amalgam and then treated with a proton donor, under an inert atmosphere, at a temperature from about 0° C. to about 40° C., for a period of from about four to about twenty-four hours. Preferably this reaction is conducted in 1,2-dimethoxyethane with freshly prepared aluminum amalgam and water, under nitrogen, at room temperature for about sixteen hours. By reaction-inert solvent as employed herein is meant an organic solvent which dissolves the 2,3-dihydro - 2 - oxo-1H-1,4-benzodiazepine-3-carboxylic acid, ester but does not interfere with the reduction thereof. Although other solvents may be employed as will suggest themselves to those skilled in the art, excellent results are obtained when 1,2-dimethoxyethane, tetrahydrofuran, dioxane or ether are employed.

The 2,3-dihydro-2-oxo-1H-1,4 - benzodiazepine-3-carboxylic acid, esters employed as starting compounds in the preparation of the compounds of this invention can be prepared by the procedure described in Belgian Patent 665,401, published Dec. 14, 1965. The time and temperature ranges cited above are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. Aluminum amalgam is prepared by successively immersing aluminum foil in ether, ethanol, 2% aqueous mercuric chloride solution, ethanol and ether.

After the reaction is complete, the reaction mixture is filtered, the filtrate evaporated and the product obtained by conventional methods, such as crystallization.

The acid hydrolysis of the esters of this invention to form the appropriate carboxylic acid and the reaction of this carboxylic acid with an alkali metal hydroxide to form the corresponding alkali metal salt are procedures well known to those skilled in the chemical art. Such procedures are described in "Organic Chemistry" by Fieser and Fieser, Third Edition, at pg. 178. In this manner, the 2,3,4,5 - tetrahydro - 2-oxo-1H-1,4-benzodiazepine-3-carboxylic acids and their alkali metal salts of the present invention are prepared.

In accord with the present invention, the new 2,3,4,5-tetrahydro - 2 - oxo-1H-1,4-benzodiazepine-3-carboxylic acids, the esters and alkali metal salts thereof, herein described have been found to possess interesting pharmaceutical properties which render them useful as synthetic medicinals. More particularly, these compounds, in standard pharmacological tests, have exhibited utility as central nervous system depressants.

When the compounds of this invention are employed as central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 500 mg. per day, although as aforementioned variations will occur. However, a dosage level that is in the range of from about 5 mg. to about 50 mg. per day is most desirably employed in order to achieve effective results.

The following examples are given by way of illustration and are not to be construed as limitations of this invention, many variations of which are possible without departing from the scope and spirit thereof.

Example I

To a solution of 2.0 g. (5.83 moles) of 7-chloro-2,3-dihydro-2-oxo-5-phenyl - 1H-1,4-benzodiazepine-3 - carboxylic acid, ethyl ester in 100 ml. of 1,2-dimethoxyethane, there is added aluminum amalgam, which freshly prepared from 2.0 g. of aluminum foil by the following procedure. The aluminum foil is cut into 1 x 7 cm. strips and then successively immersed in ether, ethanol, 2% aqueous mercuric chloride solution (immersion for 30 sec.), ethanol and ether. Thereafter, they are cut into 1 cm. squares and added to the reaction mixture. Subsequently, the reaction mixture is treated with 2.0 ml. of water and stirred under a nitrogen atmosphere at 26° C. for 16 hours. The aluminum residue is filtered onto a Super-Cel cake and the filtrate evaporated to a yellow oil which crystallizes spontaneously. Recrystallization of the product from acetonitrile affords 1.3 g. of 7-chloro-2,3,4,5-tetrahydro-2-oxo-5-phenyl - 1H - 1,4 - benzodiazepine-3-carboxylic acid, ethyl ester, M.P. 172–174° C., resolidifies and remelts at 180–182° C.

Calcd. for $C_{18}H_{17}N_2O_3Cl$: C, 62.69; H, 4.97; Cl, 10.28; N, 8.13. Found: C, 62.63; H, 5.14; Cl, 10.25; N, 8.04.

In a similar manner, 2,3-dihydro-2-oxo-5-phenyl-1H-1,4-benzodiazepine-3-carboxylic acid, methyl ester is reduced to 2,3,4,5-tetrahydro-2-oxo-5-phenyl-1H-1,4-benzodiazepine-3-carboxylic acid, methyl ester.

Example II

To a solution of 4.0 g. of 7-amino-2,3-dihydro-2-oxo-5-phenyl-1H-1,4-benzodiazepine-3-carboxylic acid, ethyl ester in 200 ml. of ether, there is added 4.0 g. of aluminum amalgam. The reaction mixture is then treated with 4 ml. of water and stirred under an argon atmosphere at 40° C. for twenty-four hours. The residue is filtered, the filtrate evaporated to dryness and the residue recrystallized from ethanol to yield 7-amino-2,3,4,5-tetrahydro-2-oxo-5-phenyl-1H-1,4-benzodiazepine-3-carboxylic acid, ethyl ester.

Similarly, 8-ethyl - 2,3,4,5-tetrahydro-2-oxo - 5-phenyl-1H-1,4-benzodiazepine-3-carboxylic acid, ethyl ester is obtained.

Example III

To a solution of 2.0 g. of 7-bromo-2,3-dihydro-2-oxo-5-phenyl-1H-1,4-benzodiazepine-3-carboxylic acid, ethyl ester in 100 ml. of 1,2-dimethoxyethane, there is added 2.0 g. of aluminum amalgam (as prepared in Example I). The reaction mixture is treated with 2.0 ml. of water and stirred under a nitrogen atmosphere at 15° C. for 20 hours. The aluminum residue is filtered and the filtrate evaporated to an oil which crystallizes spontaneously. Recrystallization of the product from ethanol affords 7-bromo - 2,3,4,5-tetrahydro-2-oxo-5-phenyl-1H-1,4-benzodiazepine-3-carboxylic acid, ethyl ester.

In a simliar manner, 5,6-dichloro-2,3,4,5-tetrahydro-2-oxo-5-phenyl-1H-1,4-benzodiazepine-3-carboxylic acid, ethyl ester is prepared.

Example IV

Employing the procedure of Examples I to III, the following 2,3,4,5-tetrahydro-2-oxo-1H-1,4-benzodiazepine-3-carboxylic acid, esters are obtained:

7-trifluoromethyl-2,3,4,5 - tetrahydro-2-oxo-5 - (2-thienyl)-1H-1,4-benzodiazepine-3-carboxylic acid, methyl ester;

2,3,4,5 - tetrahydro-7-methyl-5-(p-tolyl)-1H-1,4-benzodiazepine-3-carboxylic acid, ethyl ester;

5 - (m-fluorophenyl) - 2,3,4,5-tetrahydro-2-oxo-1H-1,4,-benzodiazepine-3-carboxylic acid, methyl ester;

2,3,4,5 - tetrahydro - 5-(p-methoxyphenyl)-2-oxo-1H-1,4-benzodiazepine-3-carboxylic acid, ethyl ester; and 5-(p-trifluoromethylphenyl) - 2,3,4,5-tetrahydro-2-oxo-1H-1,4-benzodiazepine-3-carboxylic acid, methyl ester.

Example V

To a solution of 5.0 g. of 5-(p-chlorophenyl)-2,3-dihydro-2-oxo-1H-1,4-benzodiazepine-3-carboxylic acid, propyl ester in 250 ml. of dioxane, there is added 5.0 g. of aluminum amalgam. The reaction mixture is then treated with 5 ml. of methanol and stirred under a helium atmosphere at 40° C. for six hours. The residue is filtered, the filtrate evaporated to dryness and the residue recrystallized from methanol to yield 5-(p-chlorophenyl)-2,3,4,5-tetrahydro-2-oxo - 1H-1,4 - benzodiazepine-3-carboxylic acid, propyl ester.

Example VI

To a solution of 1.0 g. of 8-chloro-5-(m-ethylphenyl)-2,3 - dihydro - 2-oxo-1H-1,4-benzodiazepine-3-carboxylic acid, butyl ester in 50 ml. of tetrahydrofuran, there is added 1.0 g. of aluminum amalgam. The reaction mixture is then treated with 1 ml. of ethanol and stirred under a nitrogen atmosphere at 25° C. for twenty hours. The residue is filtered, the filtrate evaporated to dryness and the residue recrystallized from acetonitrile to yield 8-chloro-5-(m-ethylphenyl) - 2,3,4,5-tetrahydro-2-oxo-1H-1,4-benzodiazepine-3-carboxylic acid, butyl ester.

Similarly, the following compounds are prepared:

5-(p-dichlorophenyl) - 2,3,4,5-tetrahydro-2-oxo-1H-1,4-benzodiazepine-3-carboxylic acid, ethyl ester; and 7-chloro - 2,3,4,5 - tetrahydro-2-oxo-5-(p-propoxyphenyl)-1H-1,4-benzodiazepine-3-carboxylic acid, methyl ester.

Example VII 50 ml. of an ethanolic solution of 7-chloro-2,3,4,5-tetrahydro-2-oxo-5-phenyl - 1H-1,4-benzodiazepine-3-carboxylic acid, ethyl ester (12.9 g.) is admixed and stirred for one hour with 1.5 N hydrochloric acid (25 ml.). Subsequently, the solvent is removed under vacuum and the residue is 7-chloro-2,3,4,5-tetrahydro-2-oxo-5-phenyl-1H-1,4-benzodiazepine-3-carboxylic acid, hydrochloride.

Other 2,3,4,5-tetrahydro-2-oxo-1H-1,4-benzodiazepine-3-carboxylic acid, acid addition salts of the compounds described in the above examples are prepared by similar procedures employing hydrobromic acid, hydroiodic acid, nitric acid, tartaric acid, citric acid, acetic acid, succinic acid, maleic acid and gluconic aid.

Example VIII

An ethanolic solution of 7-chloro-2,3,4,5-tetrahydro-2-oxo-5-phenyl - 1H-1,4 - benzodiazepine-3-carboxylic acid, ethyl ester (50 ml.) is admixed and stirred for one hour with 1 N sodium hydroxide (20 ml.) and the solvent removed by evaporation. The residue contains the sodium salt of 7-chloro-2,3,4,5-tetrahydro-2-oxo-5-phenyl-1H-1,4-benzodiazepine-3-carboxylic acid.

The sodium and potassium salts of the above described examples may easily be prepared by this procedure. When the potassium salt is desired, the 2,3,4,5-tetrahydro-2-oxo-1H-1,4-benzodiazepine-3-carboxylic acid, acid salt is reacted with potassium hydroxide, while, as demonstrated above, reaction with sodium hydroxide will yield the sodium salt.

What is claimed is:

1. A compound selected from the group consisting of those having the formula:

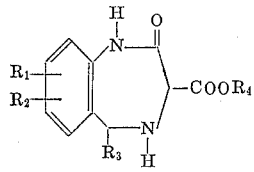

wherein $R_1$ and $R_2$ are each selected from the group consisting of hydrogen, halogen, amino, and trifluoromethyl; $R_3$ is selected from the group consisting of thienyl, phenyl, halophenyl, lower alkylphenyl, and lower alkoxyphenyl; and $R_4$ is selected from the group consisting of hydrogen, sodium, potassium and lower alkyl.

2. A compound as described in claim 1 which is: 7-chloro - 2,3,4,5 - tetrahydro-2-oxo-5-phenyl-1H-1,4-benzodiazepine-3-carboxylic acid, ethyl ester.

3. A compound as described in claim 1 which is: 2,3,4,5 - tetrahydro-2-oxo-5-phenyl - 1H-1,4-benzodiazepine-3-carxoylic acid, methyl ester.

4. A compound as described in claim 1 which is: 7-amino - 2,3,4,5-tetrahydro - 2-oxo-5-phenyl-1H-1,4-benzodiazepine-3-3-carboxylic acid, ethyl ester.

5. A compound as described in claim 1 which is: 7-bromo-2,3,4,5 - tetrahydro-2-oxo-5-phenyl-1H-1,4-benzodiazepine-3-carboxylic acid, ethyl ester.

6. A compound as described in claim 1 which is: 5,6-dichloro-2,3,4,5 - tetrahydro-2-oxo-5-phenyl-1H - 1,4-benzodiazepine-3-carboxylic acid, ethyl ester.

7. A compound as described in claim 1 which is: 5(p-chlorophenyl) - 2,3,4,5 - tetrahydro-2-oxo-1H-1,4-benzodiazepine-3-carboxylic acid, propyl ester.

8. A compound as described in claim 1 which is: 8-chloro-5-(m-ethylphenyl)-2,3,4,5-tetrahydro - 2 - oxo-1H-1,4-benzodiazepine -3-carboxylic acid, butyl ester.

9. A compound as described in claim 1 which is: 2,3,4,5 - tetrahydro-7-methyl-5-(p-tolyl)-1H - 1,4-benzodiazepine-3-carboxylic acid, ethyl ester.

10. A compound as described in claim 1 which is: 2,3,4,5 - tetrahydro-5-(p-methoxyphenyl)-2-oxo-1H - 1,4-benzodiazepine-3- carboxylic acid, ethyl ester.

References Cited

UNITED STATES PATENTS 3,213,315   11/1965   Metlesics et al. _____ 260—239.3

HENRY R. JILES, *Primary Examiner*

R. BOND, *Assistant Examiner.*